Feb. 23, 1971 K. G. BLEMEL ET AL 3,566,394
DIGITAL CODE TO ANALOG ANGLE CONVERSION SYSTEM
Filed July 3, 1967 10 Sheets-Sheet 7
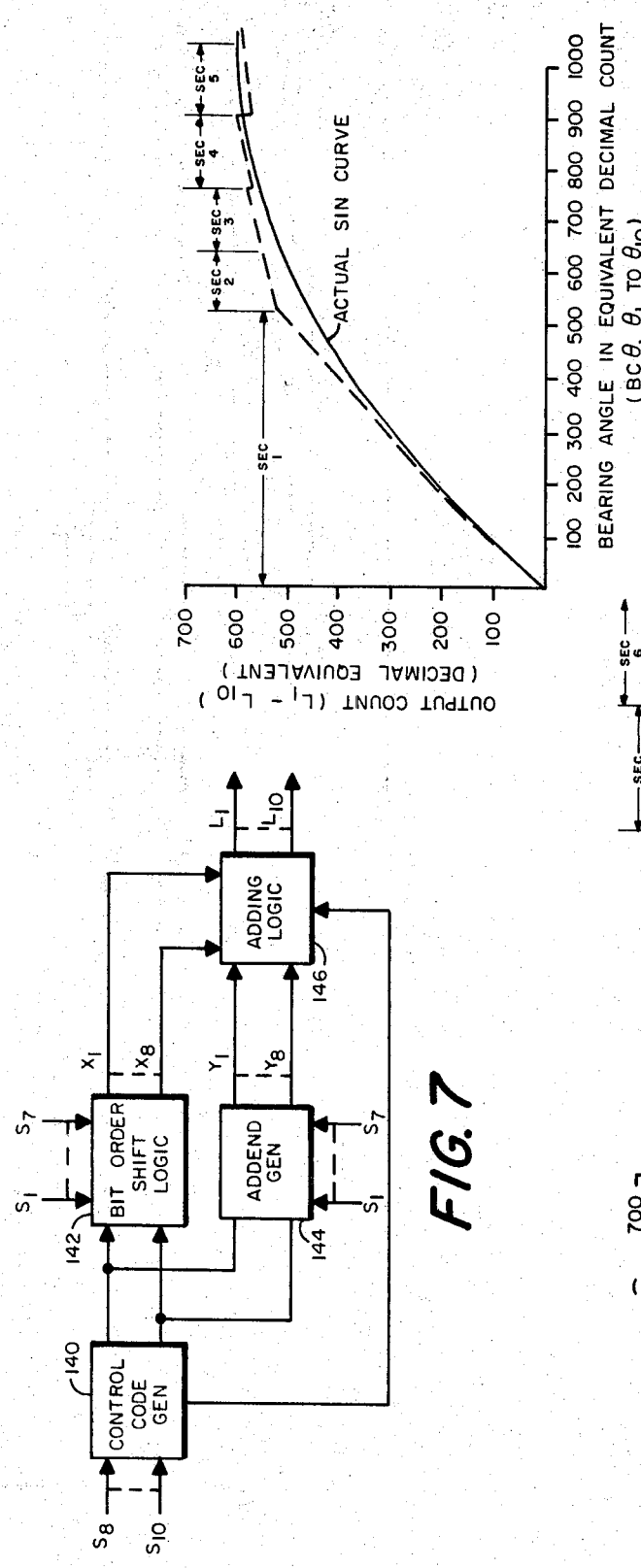
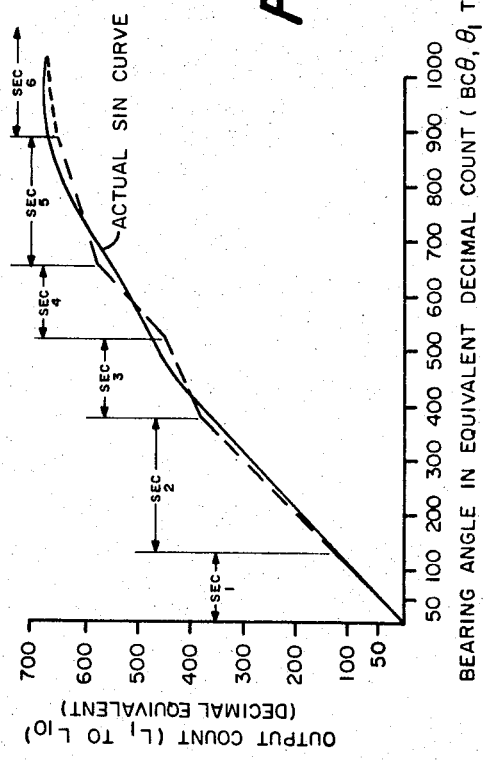

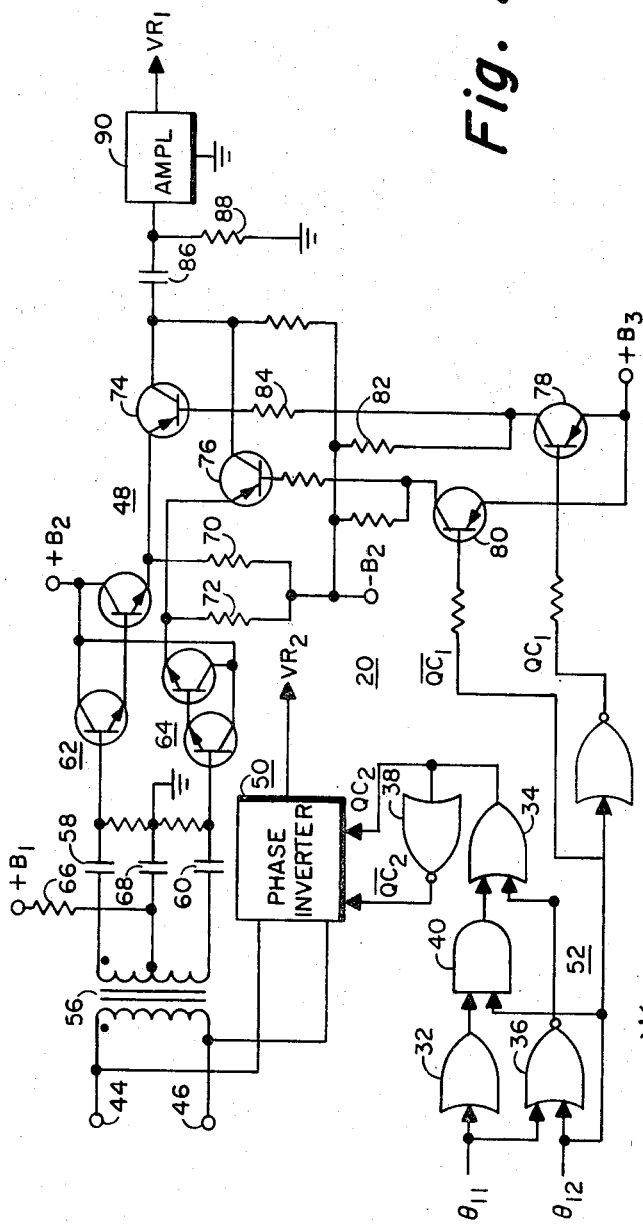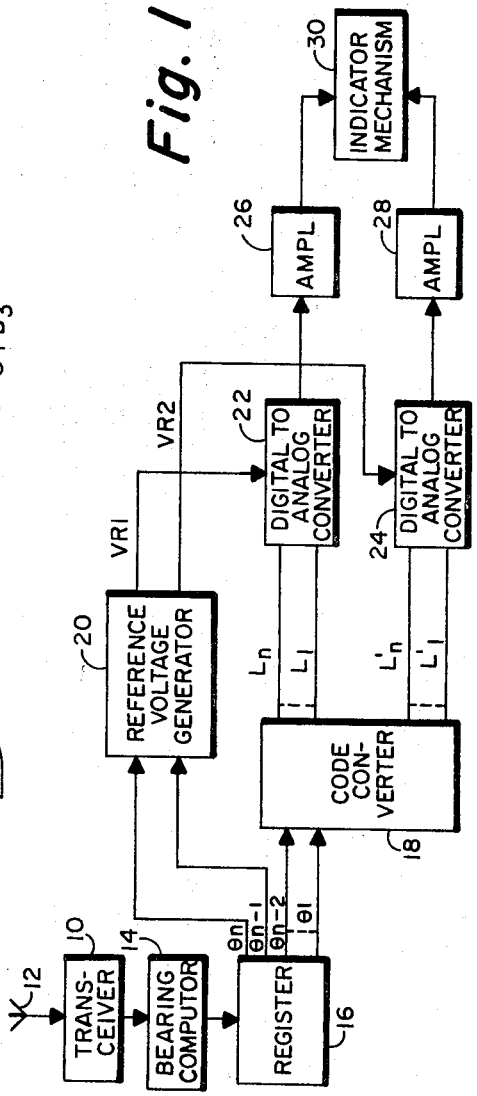
Fig. 1
Fig. 2
INVENTORS
EDWARD F. ASAM &
KENNETH G. BLEMEL

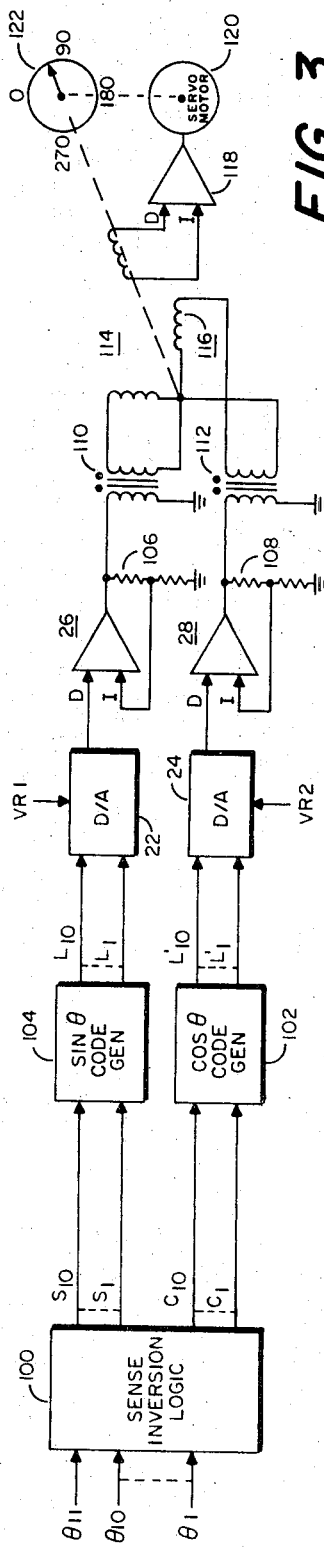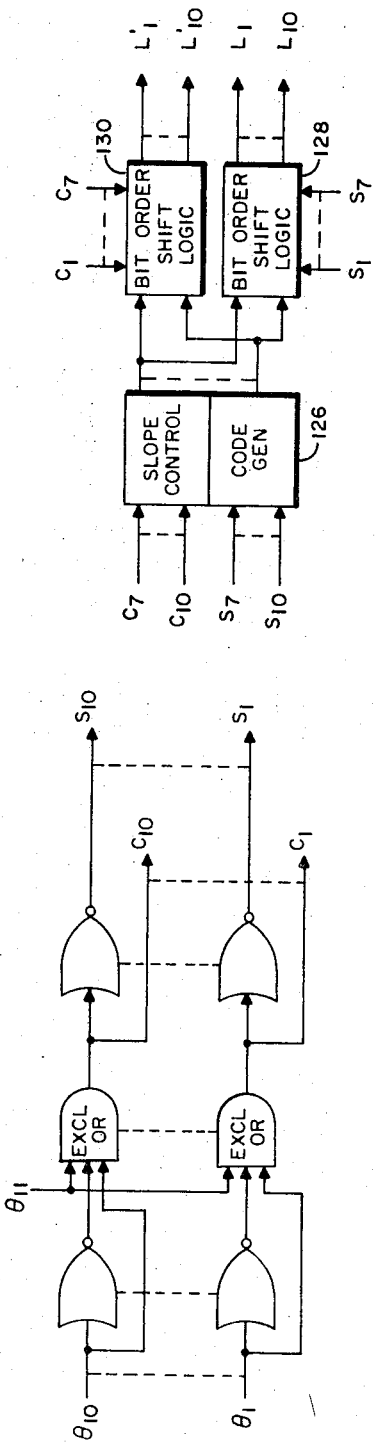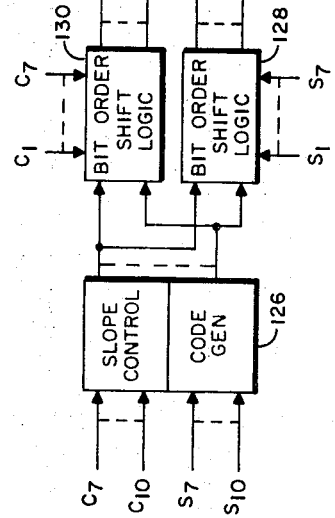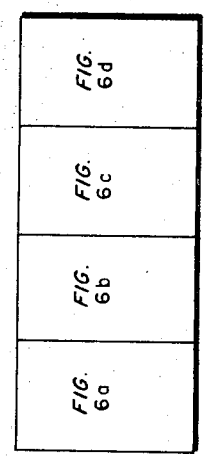
FIG. 3
FIG. 4
FIG. 5
FIG. 6

United States Patent Office 3,566,394
Patented Feb. 23, 1971

3,566,394
DIGITAL CODE TO ANALOG ANGLE CONVERSION SYSTEM
Kenneth G. Blemel and Edward F. Asam, Monroe, N.Y., assignors to General Dynamics Corporation, a corporation of Delaware
Filed July 3, 1967, Ser. No. 651,020
Int. Cl. H03k 13/04
U.S. Cl. 340—347                                    12 Claims

ABSTRACT OF THE DISCLOSURE

This disclosure describes a system for converting binary coded angle information into the analog angular position of an indicator so as to display the binary angle information. The system is operative to provide two analog voltages representing the sine and cosine of the angle which is represented by the binary code. These voltages differ from true sine and cosine functions by errors which are balanced with respect to 45°, such that the ratio of the voltages corresponds to the tangent of the angle representing the binary coded information to a high degree of accuracy. To achieve this accuracy, the higher order bits representing 180° and 90° of the angle are applied to a phase inverter and provide reference voltages which are reversed in phase to correspond to the polarity of the sine and cosine of the angle depending on the quadrant of the angle. The remaining bits of the binary coded angle information are applied to a code converter which converts these codes into functions of the sine and cosine of the angle which depart from true sines and cosines by errors which are balanced with respect to 45°. These two binary functions are applied to digital-to-analog converters and effectively modulate the reference voltages to provide analog outputs which are functions of the sine and cosine of the angle represented by the code. These voltages are applied to a servo mechanism which rotates an angle indicator to indicate the angle represented which is the arctangent of the ratio thereof.

---

The present invention relates to digital code to analog angle conversion systems and particularly to a digital code to shaft angle positioning system.

The invention is especially suitable for use in electronic navigation systems for translating digital angle information as may be obtained from a radar or tacan set into analog information which may be used to position the shaft of an indicator which displays the angle. The invention is, however, generally applicable to digital code conversion systems wherein coded information is translated into analog form.

In digital code controlled shaft positioning systems which are available, the approach taken has been to directly synthesize analog signals corresponding to sines and cosines from the coded information. Inasmuch as the sinusoidal function is not directly related to a linear digital function, complex conversion systems were required in order to obtain reasonable accuracies. Such systems, of course, are expensive, and for the most part, do not have the accuracies desired (viz. within ½° over the entire operating range). Moreover, the response of the systems to rapidly varying digital information has been limited by virtue of several computations required to obtain information necessary to change the output angle indication.

It is therefore an object of the present invention to provide an improved system for converting a digital code into position representing analog signals in which the foregoing difficulties and disadvantages have been substantially eliminated.

It is a further object of the invention to provide an improved system for digital-to-analog conversion which provides servo motor positioning signals.

It is a further object of the present invention to provide an improved analog indicator system adapted to be operated in response to a digital code and which has a higher degree of accuracy than systems of this type which have been heretofore available.

It is a still further object of the present invention to provide an improved system for positioning a shaft in response to digitally coded angle information which is more accurate, less complex, less expensive and higher in reliability than previous systems for performing the same function.

It is a still further object of the present invention to provide an improved digital angle code to analog angle converter system which is especially adapted for translating digital azimuth or bearing information as obtained from electronic navigation systems into analog information suitable for operating an analog bearing indicator.

Briefly described, a system embodying the present invention includes a reference voltage generator which provides two reference voltages which have relative polarities depending upon the quadrant of the angle information as represented by the higher order bits of the digital code which represents the information. The lower order bits are applied to a code converter which translates them into two codes representing the sine and cosine of the angle, except, of course, for the quadrant information. The code converter has logic operative to provide digital information deviating from the true sine and cosine of the angle by a certain error; the error being balanced or equal with respect to 45°. Digital-to-analog converters translate the reference voltages into analog voltages representing the sine and the cosine of the angle in response to the sine and cosine codes produced by the code converter. The sine and cosine voltages may then be applied to an indicator which responds to their ratio. Inasmuch as the ratio of the sine and cosine voltages are used, the errors therein do not affect the angle indication and therefore the system produces analog angle information with a high degree of accuracy.

The invention itself, both as to its organization and method of operation, as well as additional objects and advantages thereof will become more readily apparent from a reading of the following description in connection with the accompanying drawings in which:

FIG. 1 is a block diagram of a system embodying the invention;

FIG. 2 is a schematic diagram of the reference voltage generator shown in FIG. 1;

FIG. 3 is a block diagram showing in greater detail the code conversion and digital-to-analog conversion portions of the system shown in FIG. 1;

FIG. 4 is a logic diagram showing in greater detail the sense inversion logic shown in FIG. 3;

FIG. 5 is a block diagram showing in greater detail the sine $\theta$ and cosine $\theta$ code generators which are shown in FIG. 3;

Figure 8A:
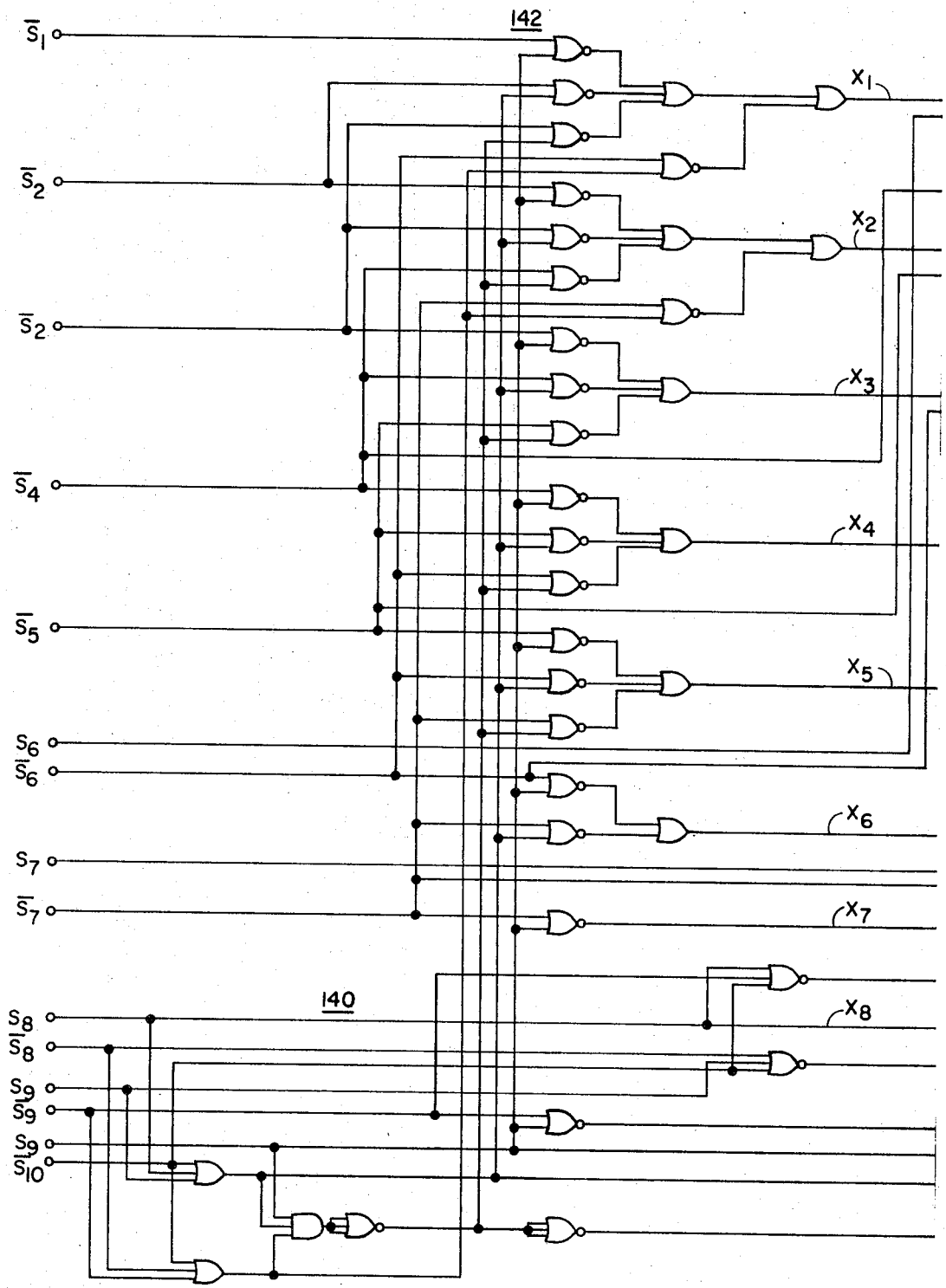
Figure 8B:
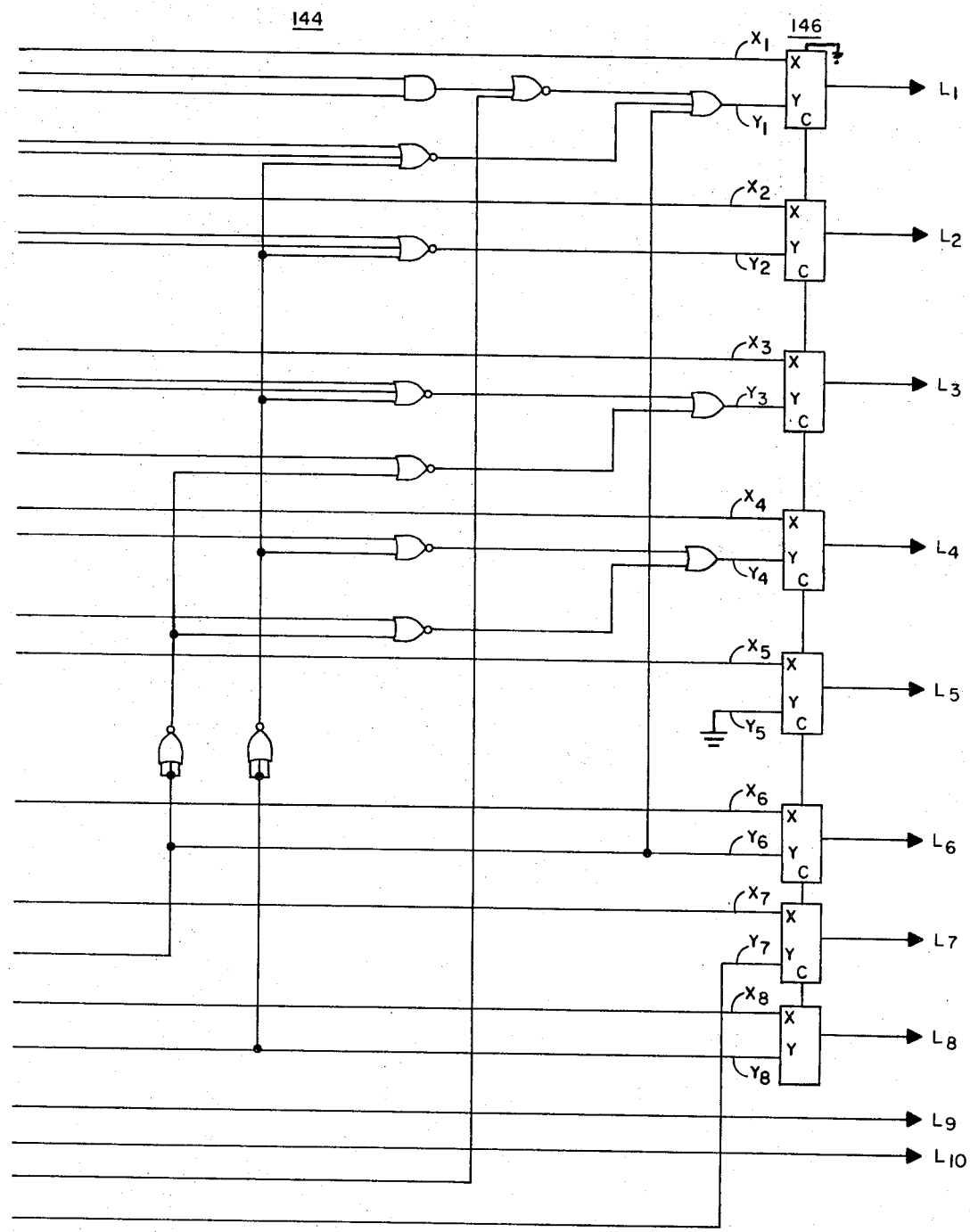
Figure 11:
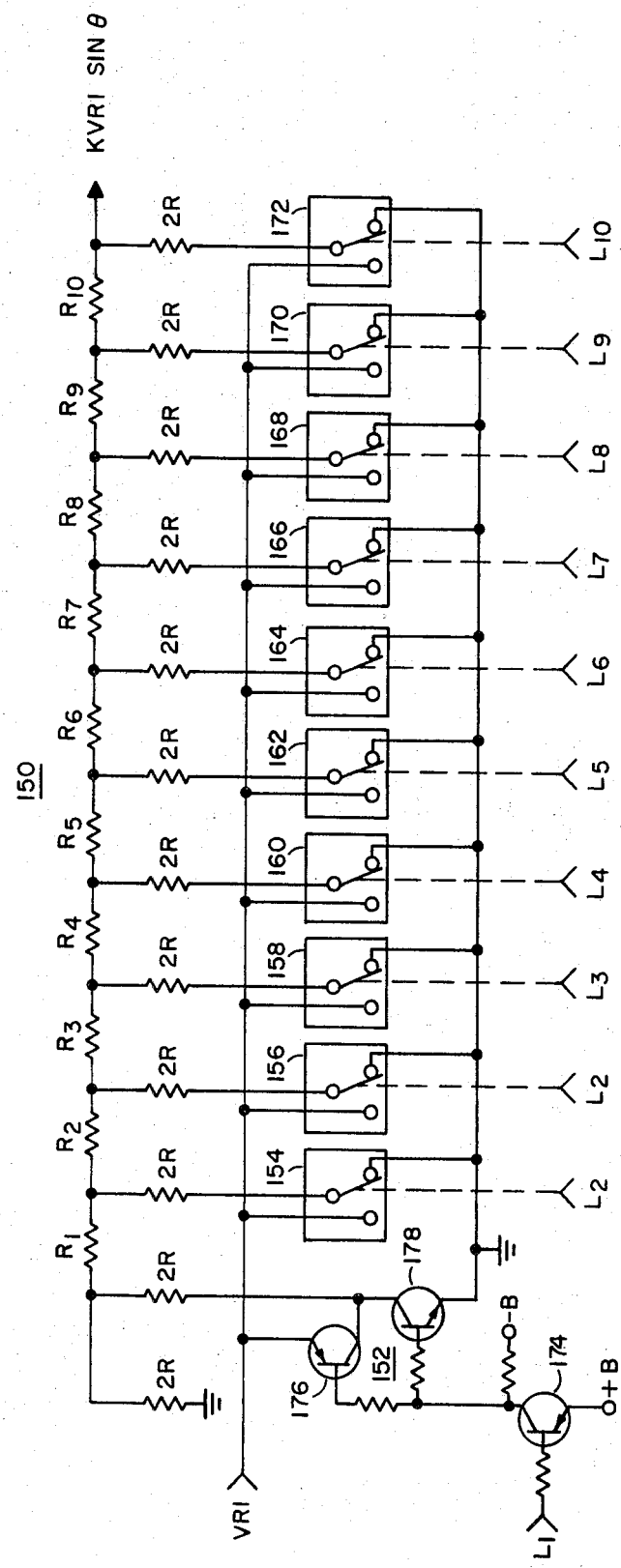

FIGS. 6a, 6b, 6c and 6d, taken together as shown in FIG. 6, is a logic diagram of the sine and cosine code generators shown in FIG. 5;

FIG. 7 is a block diagram showing a sine code generator in accordance with another embodiment of the invention;

FIGS. 8a and 8b, taken together as shown in FIG. 8, is a logic diagram of the sine code generator shown in FIG. 7;

FIG. 9 is a graph illustrating the error response of the code generator shown in FIGS. 5 and 6;

FIG. 10 is a graph showing the error response of the code generator shown in FIGS. 7 and 8; and FIG. 11 is a schematic diagram illustrating one of the digital-to-analog converters shown in FIG. 3.

Referring more particularly to FIG. 1, there is shown an electronic navigation system utilizing a system embodying the invention. The specific system illustrated is a tacan system which incorporates a transceiver 10 coupled to an antenna 12. The output of the transceiver is the decoded 135 Hz. and 15 Hz. bearing information which is transmitted by a tacan beacon. This output is fed into a bearing computer 14. The computer itself obtains a digital count, a binary coded decimal count, for example, which represents the bearing angle with respect to north or some other reference bearing. The bearing computer makes this computation by the use of a logic system which permits clock pulses to be counted during the interval between the positive-going cross-over of the 15 Hz. information and the positive cross-over of the 135 Hz. information which next succeeds this 15 Hz. cross-over. The count is updated every 15 Hz. and is stored in a register 16. The output of the register provides the input code to the conversion system; the bits being identified in the drawing as $\theta_1 \ldots \theta_{n-2}$, $\theta_{n-1}$ and $\theta_n$. The bearing computer system is described in greater detail in Pat. No. 3,332,080, issued July 18, 1967, on application Ser. No. 491,218, filed Sept. 29, 1965 and assigned to the same assignee as the present invention.

The system which embodies the invention includes a code converter 18, a reference voltage generator 20 and digital-to-analog converters 22 and 24, all of which convert the $\theta_1$ to $\theta_n$ code into a pair of analog voltages, which after amplification in a pair of amplifiers 26 and 28, drive an indicator mechanism 30 which indicates the bearing angle represented by the $\theta_1$ to $\theta_n$ code in actual degrees. The reference voltage generator 20 is controlled by the higher order bits $\theta_n$ and $\theta_{n-1}$ which represent, of course, 180° and 90° of angle, respectively. These more significant bits may be termed quadrant control bits and they control the phase of two reference voltages VR1 and VR2 which are applied to the digital-to-analog converters 22 and 24. The converters themselves include ladder networks, as will be described in greater detail in connection with FIG. 11 to which the reference voltages VR1 and VR2 are respectively applied. The code converter 18 translates the lower order bits $\theta_1$ to $\theta_{n-2}$ into the two multibit binary words $L_1$ to $L_n$ and $L'_1$ to $L'_n$ which represent approximations of the sine and the cosine respectively of the angle represented by $\theta_1$ to $\theta_{n-2}$. A significant feature of the $L'_1$ to $L'_n$ and $L_1$ to $L_n$ words are that they are not true approximations of the cosine and sine functions. Rather, they may be defined as being functions of the angle $\theta$ which, with respect to 45°, possesses a balanced percent error (hereinafter referred to as a balanced error).

The percent error of the output functions as represented by $L_1$ to $L_n$ and $L'_1$ to $L'_n$ with respect to the respective true sine and cosine of $\theta$ are essentially equal. Thus, the error represented by the word $L_1$ to $L_n$ at 12.5° is equal to the error at 57.5°. Similarly, the error represented by the word $L'_1$ to $L'_n$ with respect to the true cosine function at 12.5° and 57.5° would be equal. Furthermore, because of the nature of the sine and cosine functions, the error represented by the $L_1$ to $L_n$ word will be equal to the error represented by the $L'_1$ to $L'_n$ word. These words are reflected in analog voltages produced by modulation of the reference voltages VR1 and VR2 in the digital-to-analog converters 22 and 24. Thus, the analog voltages at the output of the converters contain errors which correspond to the errors contained in the words produced by the code converter 18. The indicator mechanism 30 operates in accordance with the ratio of these analog voltages. Inasmuch as the errors from the true sine and cosine functions are equal, they cancel when the ratio is used.

The reference voltage generator 20 and the quadrant control bits $\theta_{n-1}$ and $\theta_n$ resolve the polarity of the ratio function, and move the indicator to the proper quadrant. The error, however, is substantially eliminated. Inasmuch as the conversions from the $\theta_1$ to $\theta_{n-2}$ code into the $L_1$ to $L_n$ and $L'_1$ to $L'_n$ codes are similar, the code converter has two sections which are substantially duplications of each other, thus simplifying construction of this portion of the system. The design is further simplified, without any expense to system accuracy, by virtue of the operation of the code converter in producing the balanced error function, rather than a true sine or cosine approximation. The code converter and the other portions of the system are described in greater detail hereinafter.

Figure 6A:
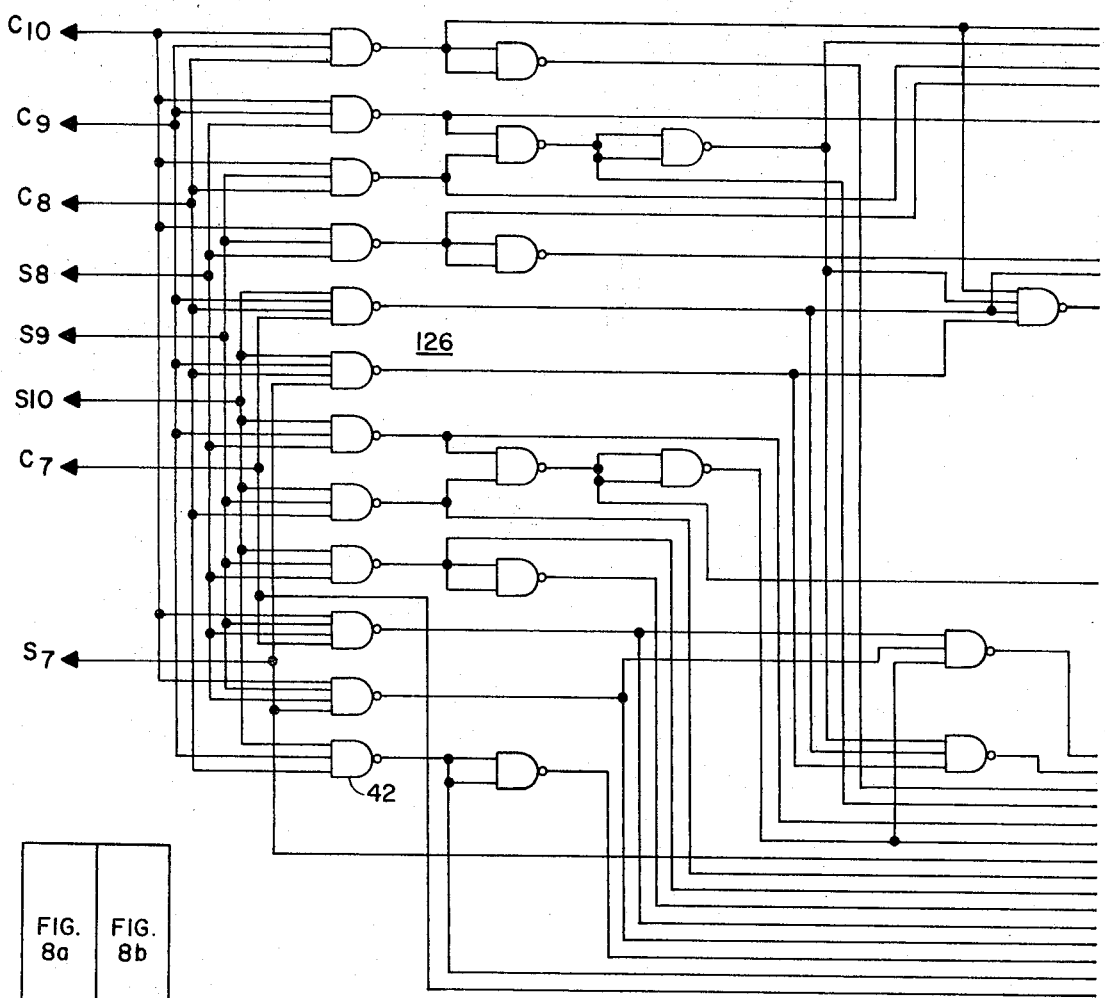
Figure 6B:
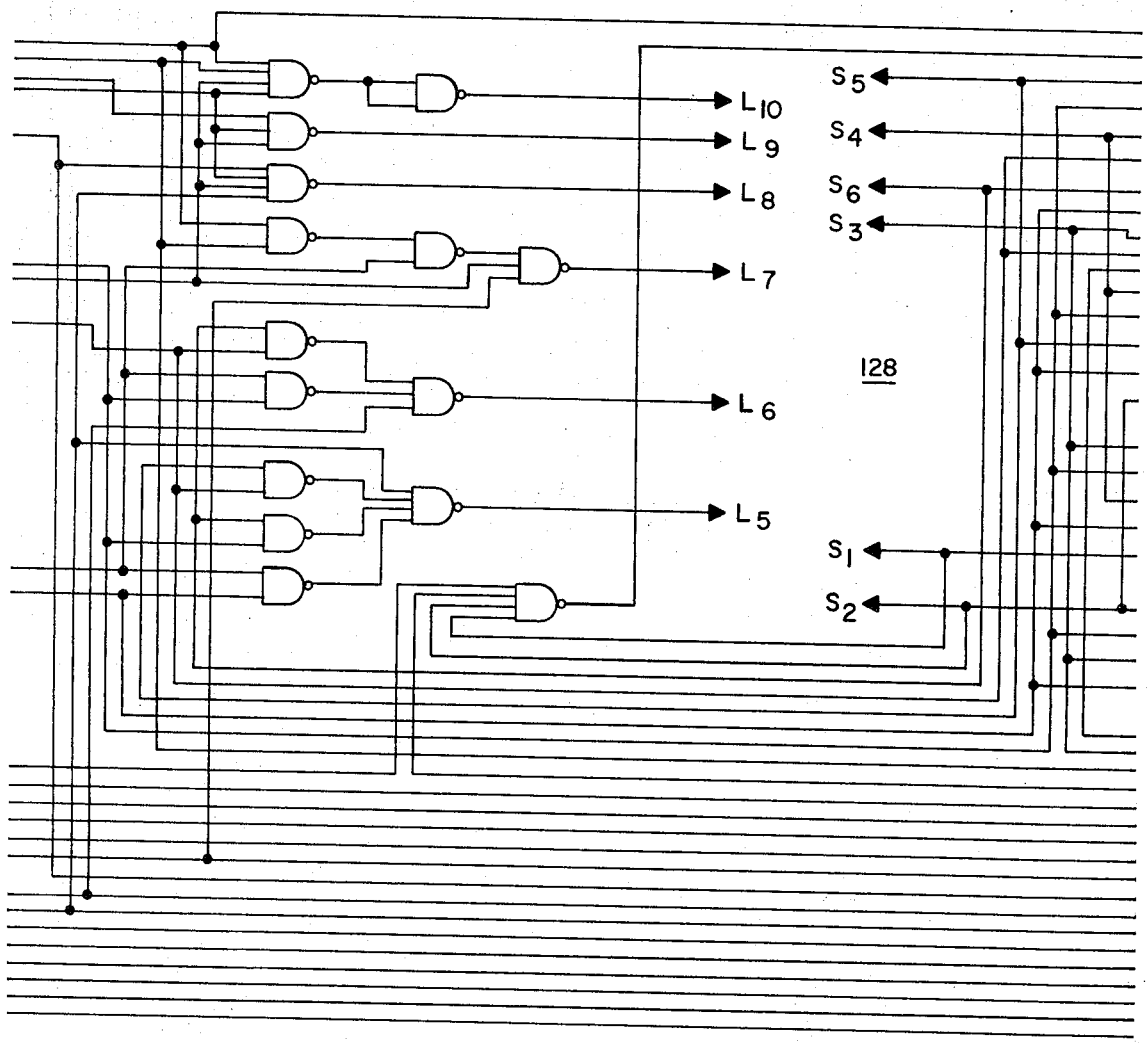
Figure 6C:
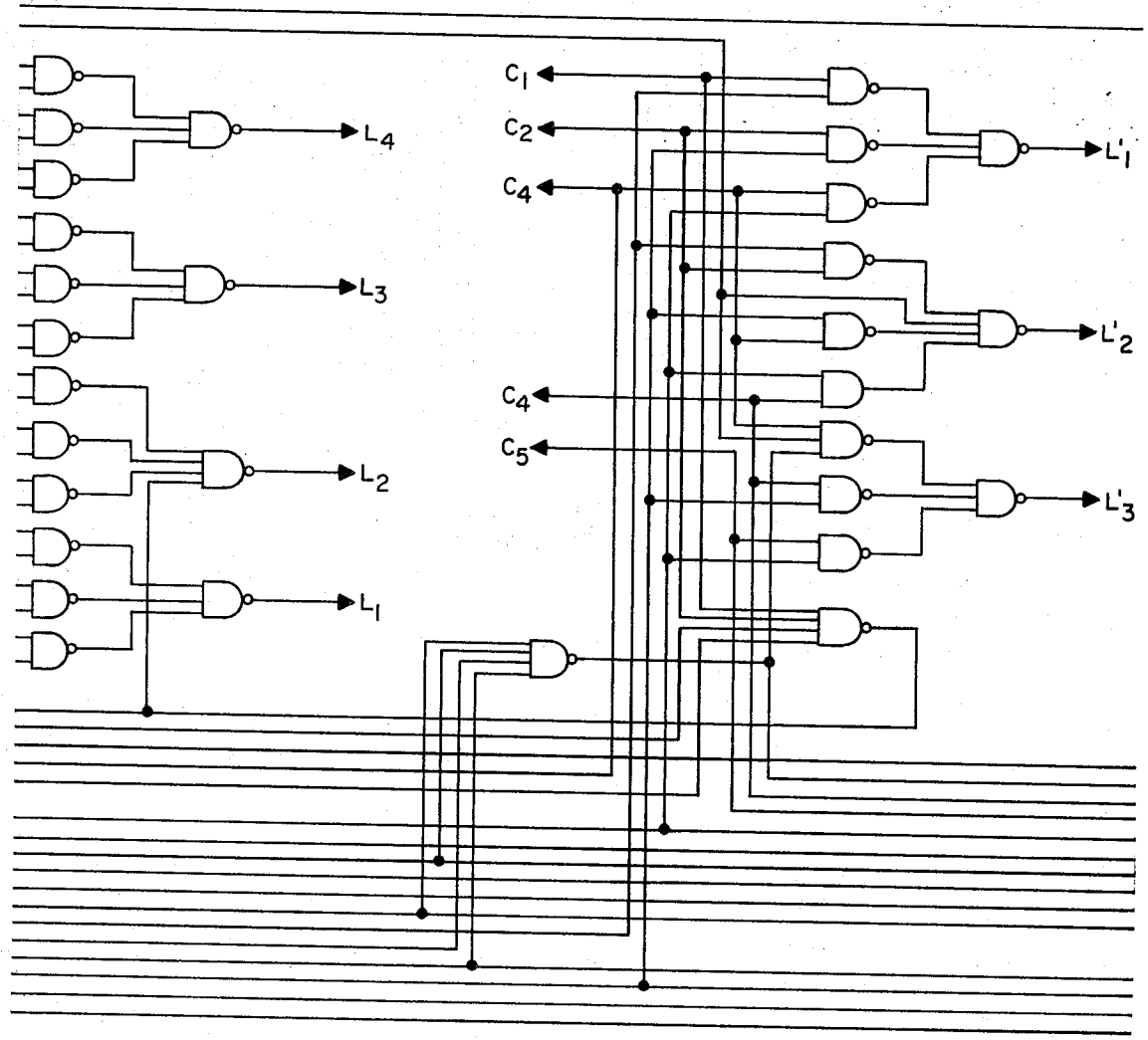
Figure 6D:
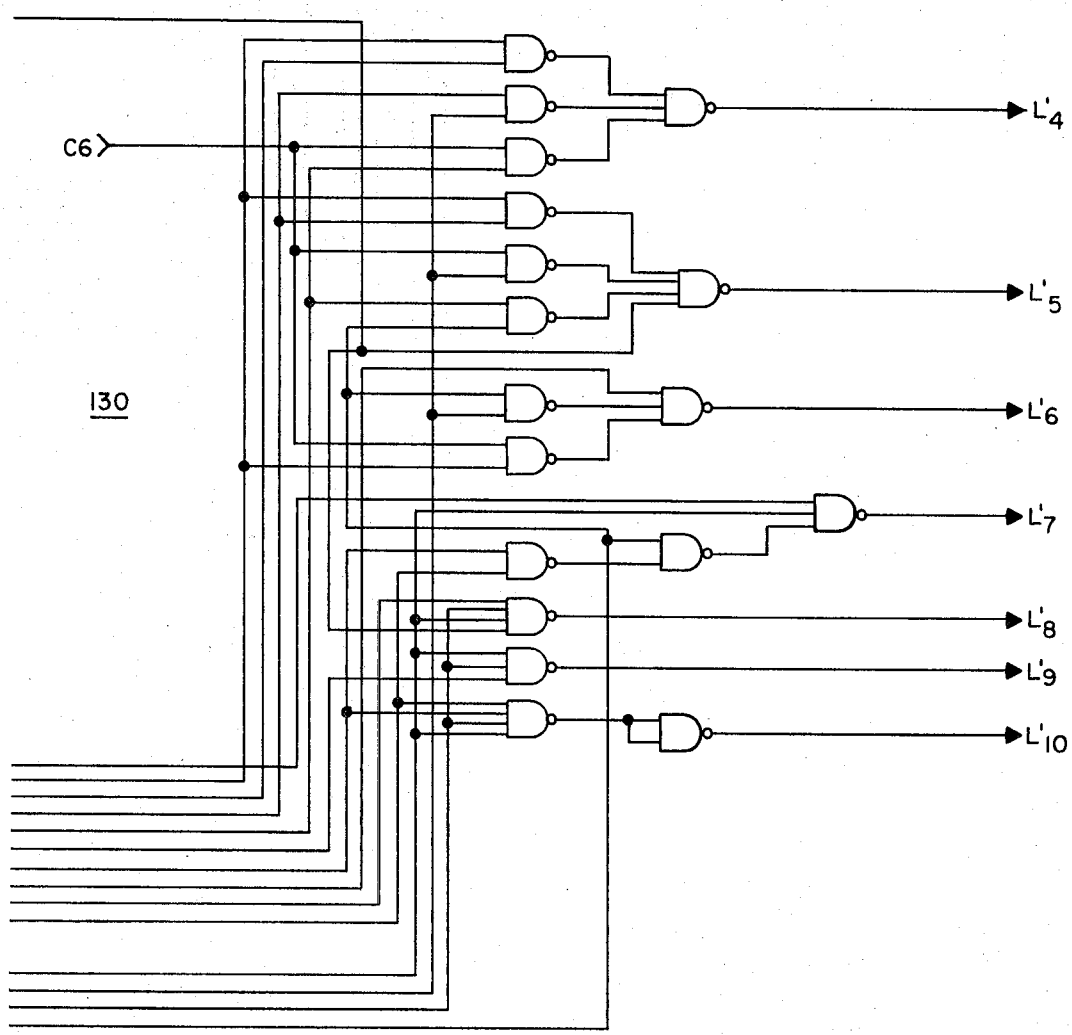

The reference voltage generator 20 is shown in FIG. 2. As the description proceeds, the binary coded angle code $\theta_1$ to $\theta_n$ will be taken as a 12 bit code. The two more significant bits therefore, are $\theta_{11}$ and $\theta_{12}$; $\theta_{12}$ being the bit which represents 180° of angle and $\theta_{11}$ being the bit which represents 90° of angle. $\theta_{11}$ and $\theta_{12}$ therefore, indicate the quadrant in which the BC$\theta$ angle is located. It should also be helpful to note at this point, the various logic symbols which are used. These logic functions may, of course, be implemented by circuit elements which are available from various manufacturers in integrated circuit form. They may, of course, also be fabricated from transistors, diodes and other discrete circuit elements in accordance with known desired techniques. Four types of logic elements are shown in the drawings. Three of these are illustrated in FIG. 2; OR gates 32 and 34, NOR gates 36 and 38 and AND gate 40. NAND gates, such as the gate 42 shown in FIG. 6a, are also used in the system. The gates are represented by their descriptive forms in accordance with established conventions.

The reference voltage generator receives input alternating current voltage, say 400 Hz., applied at input terminals 44 and 46. This voltage is applied to two phase inverter circuits 48 and 50 which are operated by control logic 52 responsive to the $\theta_{11}$ and $\theta_{12}$ bits. The control logic 52 provides control bits $QC_1$ and its complement $\overline{QC_1}$ for the phase inverter 48 and $QC_2$ and $\overline{QC_2}$ for the phase inverter 50. The control logic 52 provides output bits having the values indicated in the following table for each of the four quadrants I, II, III, and IV.

|  | $\theta_{12}$ | $\theta_{11}$ | $QC_1$ | $QC_2$ |
| --- | --- | --- | --- | --- |
| Quadrant: | | | | |
| I | 0 | 0 | 1 | 1 |
| II | 0 | 1 | 1 | 0 |
| III | 1 | 0 | 0 | 0 |
| IV | 1 | 1 | 0 | 1 |

It will be recalled that the reference voltages VR1 and VR2 are respectively utilized to generate the analog sine and cosine functions. Inasmuch as the sine function is negative, in quadrants III and IV, the alternating current voltage applied to the reference terminals 44 and 46 is inverted in the phase inverter circuit 48. Similarly, the phase inverter circuit 50 inverts the input voltage which is applied to the terminals 44 and 46 in the quadrants II and III, thereby making VR2 negative with respect to VR1 in quadrants II and III.

Since the phase inverter 48 is similar to the phase inverter 50, only the circuitry of the inverter 48 is shown. The input terminals 44 and 46 are connected to the transformer 56. The input voltage is applied through blocking capacitors 58 and 60 in opposite phase to operate dual transistor emitter follower circuits 62 and 64. Operating voltages for these circuits are applied from sources indicated as $+B_2$ and $-B_2$. The coupling capacitors 58 and 60 are large polarized capacitors for decoupling purposes. A polarizing bias for these capacitors is obtained from a source at $+B_1$ which is connected through a decoupling filter including a resistor 66 and capacitor 68. The outputs of the emitter follower pairs 62 and 64 are taken across output resistors 70 and 72 respectively. These outputs are alternatively selected by gate transistors 74 and 76 which are controlled respectively by switching transistors 78 and 80. If transistor 78 is "off" (non-conducting) and transistor 80 is "on" (conducting), operating bias from the source $-B_2$ is applied via resistors 82 and 84 to the base of the transistor 74, which is then turned on. The output voltage VR1 is obtained via a decoupling filter including a capacitor 86 and a resistor 88 and through an amplifier 90. The amplifier is desirably an operational amplifier having 100% feedback resulting in a unity gain and low output impedance as is desirable for driving the ladder network of the digital-to-analog converter 22 (FIG. 1).

It will be observed that $QC_1$ is "1" in quadrants I and II. A "1" bit may be taken as a positive level which maintains the PNP transistor 78 in an off or non-conducting condition. The complementary voltage which represents $\overline{QC}_1$ causes the transistor 80 to conduct. Current flowing from $+B_3$ to $-B_2$ through transistor 80 establishes a positive voltage level on the base of transistor 76 which prevents the inverted reference voltage which is available across the emitter follower resistor 72 from appearing at the output as VR1. Of course, in quadrants II and IV, the values of the bits $QC_1$ and $\overline{QC}_1$ reverse. Therefore the output VR1 is obtained from the voltage developed across the emitter follower resistor 72, rather than the resistor 70. Then the output voltage VR1 is inverted in phase with respect to the input voltage applied to the terminals 44 and 46. The phase inverters 50 produce its output VR2 which is inverted with respect to the input voltage applied to the terminals 44 and 46 in the second and third quadrants when $QC_2$ is "0."

Referring to FIG. 3, the code converter 18 is shown as being composed of three elements; namely, a sense inversion logic system 100 and sine $\theta$ and cosine $\theta$ generators 104 and 102, the outputs of which are respectively applied to the sine and cosine digital-to-analog converters 22 and 24, together with the sine and cosine reference voltages VR1 and VR3. The modulated reference voltages representing the sines and cosines of the input $BC\theta$ information which is obtained at the output of the digital-to-analog converters 22 and 24 is applied to the amplifiers 26 and 28. These amplifiers are high gain operational amplifiers with direct (D) and inverting (I) inputs. The feedback resistors 106 and 108 which are connected across the output of the amplifiers 26 and 28 are matched, so that the temperature response characteristics are similar. The output of the amplifiers as taken across the feedback resistors is applied by way of coupling transformers 110 and 112 to a servo mechanism 114 which functions as the indicator 30 (FIG. 1).

The servo mechanism 114 includes a resolver 116 having stator windings and a rotor winding. An error voltage is obtained across the rotor of the resolver. This voltage is zero when the rotor of the resolver is at angular position equal to the arctangent of the ratio of the voltages applied to the two stator windings (i.e. the ratio of the analog voltages at the output of the amplifiers 26 and 28). A servomechanism including a differentially connected operational amplifier 118 and a servo motor 120, whose output shaft is coupled to the rotor of the resolver 116, is used to turn the rotor to a position where the resolver rotor voltage is zero or null position. The servo motor also turns the needle of an indicator dial 122 from which the angle may be read directly in degrees.

The sense inversion logic system 100 of the code generator converts the linearly increasing input count represented by the $BC\theta$ input word into an increasing or decreasing count depending on the quadrant of the angle represented by the $BC\theta$ input information. Inasmuch as two output words representing the sine and cosine error functions are produced, the linear binary count, $\theta_1$ to $\theta_{10}$ represented by the lower order bits (all except the quadrant control bits), is transformed into two binary coded words; $S_1$ to $S_{10}$, which provides the control for the sine $\theta$ code generator 104 and $C_1$ to $C_{10}$ which provides the control for the cosine $\theta$ code generator 102. Inasmuch as the absolute sine function is increasing in the first and third quadrants and decreasing in the second and fourth quadrants, the input word $\theta_1$ to $\theta_{10}$ is transformed into the binary word $S_1$ to $S_{10}$, such that $S_1$ to $S_{10}$ increases with $\theta_1$ to $\theta_{10}$ in the first and third quadrants, but decreases from a maximum value with increasing values of $\theta_1$ to $\theta_{10}$ in the second and fourth quadrants. The other binary coded word $C_1$ to $C_{10}$ similarly decreases and increases, however, the decreasing values of $C_1$ to $C_{10}$ occur in the first and third quadrants, while the increasing values thereof occur in the second and fourth quadrants.

This sense inversion which produces the output $S_1$ to $S_{10}$ and $C_1$ to $C_{10}$ is obtained with the logic system shown in FIG. 4. The value of the bit $\theta_{11}$ dictates the quadrant in which the $BC\theta$ input word is located. In other words, $\theta_{11}$ will be "1" in the second and fourth quadrants only. These are the very quadrants where the sine binary word $S_1$ to $S_{10}$ decreases with increasing values of the input word $\theta_1$ to $\theta_{10}$. The complementary situation exists for the $C_1$ to $C_{10}$ word. Accordingly, the inversion is obtained by using the $\theta_{11}$ bit as a control bit in an exclusive OR function which implements the expression, $\overline{S}_n = \theta_n \theta_{11} + \overline{\theta}_n \theta_{11}$. An inverter is used to provide the binary $S_1$ to $S_{10}$ word for each of the $\theta_1$ to $\theta_{10}$ bits.

The sine $\theta$ and cosine $\theta$ generators 104 and 102 transform the binary words $S_1$ to $S_{10}$ and $C_1$ to $C_{10}$ into functions of $\theta$ which approximate the sine and cosine functions to the extent that the error or deviation of these from the actual sine or cosine functions is balanced with respect to 45°. Two embodiments of code generators in accordance with the invention are described herein. One of these embodiments is shown in block form in FIG. 5.

In FIG. 5, the system is shown as comprising a slope control code generator 126 having two parts; one part of which is controlled by the higher order cosine bits $C_7$ to $C_{10}$ and the other part of which is controlled by the higher order sine bits $S_7$ to $S_{10}$. The slope control generator produces control words containing a plurality of bits which are applied to bit order shift logic networks 128 and 130. The lower order bits $S_1$ to $S_7$ of the sine binary word are applied to the logic network 128, while the lower order bits $C_1$ to $C_7$ are applied to the cosine shift logic network 130. These logic networks 128 and 130 are identical insofar as the connection of the gates therein is concerned. By shifting the order of the bits in accordance with the values of different ones of the higher order bits, the output words $L_1$ to $L_{10}$ and $L'_1$ to $L'_{10}$ have slopes which deviate from the actual sine or cosine curves in a manner such that the error with respect to these actual sine and cosine curves is balanced with respect to 45°.

The operation of the bit order shift logic and of the code generator as a whole may be more apparent from FIG. 9. The input $BC\theta$ word $\theta_1$ to $\theta_{10}$ can, of course, have a maximum value in equivalent decimal count of 1,023. Thus, 45° is equivalent to a count of 512. The output count $L_1$ to $L_{10}$ which is obtained from the bit order shift logic 128, has a slope which varies in each of six different segments of the total count. These segments are from a count of 0 to 127, from 128 to 383, from 384 to 511, from 512 to 639, from 640 to 895, and from 896 to 1,023. These segments may be subdivided into finer segments, as will become more apparent as the description proceeds. However, in each of the segments, each of the four high order bits $L_7$ to $L_{10}$ have distinct and different code combinations, such that if the slope of the function represented by the output word $L_1$ to $L_{10}$ is balanced with respect to the slope at 45° or a count of 512. This balanced relationship can be observed from the actual sine curve shown in FIG. 9, by the solid line, and the output curve which is shown by the dotted line. The error at angles which differ by the same number of degrees from 45° is the same. Thus, at the angle which corresponds to a count of 450 and a count of 575, the error is zero. It should be noted, of course, that this balanced relationship with respect to 45° is not exact, inasmuch as binary logic is used to construct the error function. The deviations from the true balanced error condition will reflect themselves in errors in the output angle. All of such errors are, however, manifested only as second order effects, such that the error indicated on the servo mechanism is below the resolution of that mechanism (e.g. less than ½°). Moreover, the input count is constantly changing and the actual error statistically will tend to stay far less than the resolution of the servo mechanism (e.g. less than 0.2°).

The code generator, including the slope control logic 126 and the bit order shift logic networks 128 and 130 are shown in FIGS. 6a through 6d, operation of which is in accordance with the following truth table.

trol bits $S_8$ to $S_{10}$ are used to shift the slope of the output word $L_1$ to $L_{10}$ with increasing count in five discrete sectors; namely, from 0 to 44.91° (sector 1); from 45 to 55.16° (sector 2); from 56.25 to 67.41° (sector 3); from 67.5 to 78.66° (sector 4); and from 78.75 to 89.90° (sector 5). In each of these sectors, the three control bits $S_8$, $S_9$ and $S_{10}$ is represented by a different code and in each sector the slope is varied by the use of a shift toward lower order bits. In the first sector, zero shift is used so that the bits $S_1$ to $S_7$ pass directly to the output of the logic network 142. In other words, $S_1=X_1$, $S_2=X_2$ ... $S_7=X_7$. The eighth bit is passed through directly, i.e., $S_8=X_8$ under all circumstances. In the second sector, a right shift of one place or order is accomplished, i.e., the logic 142 functions shift the number downward (viz. to a lower number than it actually is). This decreases

TABLE I

| BCθ | Out-puts | | | | | | | | | | | | | | | | | | |
|---|---|---|---|---|---|---|---|---|---|---|---|---|---|---|---|---|---|---|---|
| | $L_{10}$ | $L_9$ | $L_8$ | $L_7$ | $L_6$ | $L_5$ | $L_4$ | $L_3$ | $L_2$ | $L_1$ | $L_{10}'$ | $L_9'$ | $L_8'$ | $L_7'$ | $L_6'$ | $L_5'$ | $L_4'$ | $L_3'$ | $L_2'$ | $L_1'$ |
| 0 0 0 0 0 0 0 0 0→<br>0 0 0 1 1 1 1 1 1 1<br>0→ 1 2 7 | 0 | 0 | 0 | $S_7$ | $S_6$ | $S_5$ | $S_4$ | $S_3$ | $S_2$ | $S_1$ | 1 | 0 | 1 | 0 | 0 | 1 | 0 | 0 | 0 | 0 |
| 0 0 1 0 0 0 0 0 0→<br>0 0 1 1 1 1 1 1 1 1<br>1 2 8→ 2 5 5 | 0 | 0 | 1 | $S_7$ | $S_6$ | $S_5$ | $S_4$ | $S_3$* | 0* | 0* | 1 | 0 | 0 | 1 | 1 | $C_7$ | $C_6$ | $C_5$ | $C_4$ | $C_3$ |
| 0 1 0 0 0 0 0 0 0→<br>0 1 0 1 1 1 1 1 1 1<br>2 5 6→ 3 8 3 | 0 | 1 | 0 | $S_7$ | $S_6$ | $S_5$ | $S_4$ | $S_3$* | 0* | 0* | 1 | 0 | 0 | 1 | 0 | $C_7$ | $C_6$ | $C_5$ | $C_4$ | $C_3$ |
| 0 1 1 0 0 0 0 0 0→<br>0 1 1 0 1 1 1 1 1 1<br>3 8 4→ 4 4 7 | 0 | 1 | 1 | 0 | $S_7$ | $S_6$ | $S_5$ | $S_4$ | $S_3$ | $S_2$ | 1 | 0 | 0 | 0 | $C_6$ | $C_5$ | $C_4$ | $C_3$* | 0* | 0* |
| 0 1 1 1 0 0 0 0 0→<br>0 1 1 1 1 1 1 1 1 1<br>4 4 8→ 5 1 1 | 0 | 1 | 1 | 0 | $S_7$ | $S_6$ | $S_5$ | $S_4$ | $S_3$ | $S_2$ | 0 | 1 | 1 | 1 | $C_6$ | $C_5$ | $C_4$ | $C_3$* | 0* | 0* |
| 1 0 0 0 0 0 0 0 0→<br>1 0 0 0 1 1 1 1 1 1<br>5 1 2→ 5 7 5 | 0 | 1 | 1 | 1 | $S_6$ | $S_5$ | $S_4$ | $S_3$* | 0* | 0* | 0 | 1 | 1 | 0 | $C_7$ | $C_6$ | $C_5$ | $C_4$ | $C_3$ | $C_2$ |
| 1 0 0 1 0 0 0 0 0→<br>1 0 0 1 1 1 1 1 1 1<br>5 7 6→ 6 3 9 | 1 | 0 | 0 | 0 | $S_6$ | $S_5$ | $S_4$ | $S_3$* | 0* | 0* | 0 | 1 | 1 | 0 | $C_7$ | $C_6$ | $C_5$ | $C_4$ | $C_3$ | $C_2$ |
| 1 0 1 0 0 0 0 0 0→<br>1 0 1 1 1 1 1 1 1 1<br>6 4 0→ 7 6 7 | 1 | 0 | 0 | 1 | 0 | $S_7$ | $S_6$ | $S_5$ | $S_4$ | $S_3$ | 0 | 1 | 0 | $C_7$ | $C_6$ | $C_5$ | $C_4$ | $C_3$* | 0* | 0* |
| 1 1 0 0 0 0 0 0 0→<br>1 1 0 1 1 1 1 1 1 1<br>7 6 8→ 8 9 5 | 1 | 0 | 0 | 1 | 1 | $S_7$ | $S_6$ | $S_5$ | $S_4$ | $S_3$ | 0 | 0 | 1 | $C_7$ | $C_6$ | $C_5$ | $C_4$ | $C_3$* | 0* | 0* |
| 1 1 1 0 0 0 0 0 0→<br>1 1 1 1 1 1 1 1 1 1<br>8 9 6→ 1 0 2 3 | 1 | 0 | 1 | 0 | 0 | 1 | 0 | 0 | 0 | 0 | 0 | 0 | 1 | $C_7$ | $C_6$ | $C_5$ | $C_4$ | $C_3$ | $C_2$ | $C_1$ |

*Whenever $S_3$, $S_2$, $S_1$ or $C_3$, $C_2$, $C_1$ have the configuration 100, the out-puts $L_3$, $L_2$, $L_1$ and $L_3'$, $L_2'$, $L_1'$ are 010.

The code converter system shown in FIG. 7 accomplishes the translation from the sine binary word including bits $S_1$ to $S_{10}$ into the output word $L_1$ to $L_{10}$ in accordance with another embodiment of the invention. Only the sine code converter is shown in FIG. 7; the cosine code converter being identical. The higher order bit of the sine word $S_8$ to $S_{10}$ are applied to a control code generator 140 which generates sets of control codes, one of which is applied to a bit order shift logic network 142 and to an addend code generator 144. Arithmetic logic 146 adds output bits $X_1$ to $X_8$, which result from the operation of the bit order shift logic on the lower order bits $S_1$ to $S_7$, in response to the control code from the generator 140, to the addend $Y_1$ to $Y_8$, a word which result from the operation of the addend generator on the lower bits $S_1$ to $S_7$, under the control of the code generator 140. The adding logic 146 produces the output bits $L_1$ to $L_{10}$. It has been found that the use of an addend provides greater accuracy in obtaining the sine and cosine $\theta$ error functions than is the case with the code generator described in connection with FIGS. 5 and 6. The latter code generator operates only to shift the slope of the output word $L_1$ to $L_{10}$ as the input BCθ count increases. The code generator of FIG. 7 adds additional accuracy by permitting level shifts as well as slope correction. The result is graphically illustrated in FIG. 10 wherein it is shown how the conthe slope of the decimal count represented by the output word $X_1$ to $X_8$. A shift of two places to the right occurs in the third and fourth sector and a shift of five places to the right in the fifth sector so that the slope becomes negligible as the input starts to represent a count approaching 90°. The addend $Y_1$ to $Y_8$ is generated, however, and added to the bit order shift logic output word $X_1$ to $X_8$. This addend has a zero value in the first and fifth sectors. However, the value changes in the second, third and fourth sectors in order to correct the level represented by the output word. The resultant output word $L_1$ to $L_{10}$ has an error function which is more accurately balanced with respect to 45° (a decimal count of 512) than was the case with the error function shown in FIG. 9.

FIGS. 8a and 8b, taken together as shown in FIG. 8, depict a detailed logic diagram of the code generator of FIG. 7. The portions of the logic which perform the function of the code control generator 140, bit of the shift logic 142, addend generator 144 and adding logic 146 are generally indicated. More specifically, the adding logic is constituted of a chain of full adders, the carry outputs of the lower order ones provide inputs to the next succeeding higher order full adders. The $S_9$ and $S_{10}$ bits are carried forward to provide the $L_9$ and $L_{10}$ bits with minimal processing.

The following truth table of the code shown in FIG. 8 describes its operation. For the sake of simplicity, only representative ones of the 1,023 different binary counts is shown. However, the limits and the counts in each of the sectors is represented. Thus, in the first sector the control bits $S_8$, $S_9$ and $S_{10}$ are illustrated as having the value of 0 . . . which at 0° will, of course, be 000 and at 44.91° will, of course, be 011. The column labeled shift shows how many places or orders the binary count represented by $S_1$ through $S_7$ must be shifted to the right (i.e. so shift in the first sector and in the second sector the shift to the right is one order, in the third and fourth sectors two orders, and in the fifth sector five orders). The values of the bits $X_1$ to $X_7$ which are obtained is therefore apparent from observation and has not been given in the table. The addend $Y_1$ to $Y_8$ which is generated by the addend generator for each of the representative counts is also depicted. The output bits are similarly depicted.

156, 158, 160, 162, 164, 166, 168, 170 and 172 which are respectively controlled by the output bits $L_1$ to $L_{10}$. The transistor switching circuits are in effect single pole-double throw switches and are illustrated as such in the cases of the switches 154 through 172.

The transistor switch 152 is shown in detail by way of example. The circuit includes three transistors 174, 176 and 178. The bias and voltage for these transistors is obtained from a source indicated as +B. This source desirably has a higher voltage output level than the peak value of reference generator voltage VR1. For example, if VR1 has a value of 1 volt (RMS), +B could suitably be +2 volts DC. The other source of operating voltage is indicated as −B and may be, for example, 12 volts negative. When $L_1$ is a binary "1" bit in the form of a positive level, transistor 124 is turned "off," thereby permitting a large value of negative biasing potential to be applied to transistors 176 and 178 which are respectively turned "on" and "off" by virtue of their being PNP and

TABLE II

| Sector | Decimal count | | Control bits | | | Binary count | | | | | | | | | | | | | | | Shift |
|---|---|---|---|---|---|---|---|---|---|---|---|---|---|---|---|---|---|---|---|---|---|
| | From | To | $S_{10}$ | $S_9$ | $S_8$ | From | | | | | | | To | | | | | | | |
| | | | | | | $S_7$ | $S_6$ | $S_5$ | $S_4$ | $S_3$ | $S_2$ | $S_1$ | $S_7$ | $S_6$ | $S_5$ | $S_4$ | $S_3$ | $S_2$ | $S_1$ | |
| 0° to 44.91° | 0 0 0 | 5 1 1 | 0 | – | – | 0 | 0 | 0 | 0 | 0 | 0 | 0 | 1 | 1 | 1 | 1 | 1 | 1 | 1 | 0 |
| | 5 1 2 | 5 4 3 | 1 | 0 | 0 | 0 | 0 | 0 | 0 | 0 | 0 | 0 | 0 | 0 | 1 | 1 | 1 | 1 | 1 | 1 |
| 45.0° to 56.16° | 5 4 4 | 5 7 5 | 1 | 0 | 0 | 0 | 1 | 0 | 0 | 0 | 0 | 0 | 0 | 1 | 1 | 1 | 1 | 1 | 1 | 1 |
| | 5 7 6 | 6 0 7 | 1 | 0 | 0 | 1 | 0 | 0 | 0 | 0 | 0 | 0 | 1 | 0 | 1 | 1 | 1 | 1 | 1 | 1 |
| | 6 0 8 | 6 3 9 | 1 | 0 | 0 | 1 | 1 | 0 | 0 | 0 | 0 | 0 | 1 | 1 | 1 | 1 | 1 | 1 | 1 | 1 |
| | 6 4 0 | 6 4 7 | 1 | 0 | 1 | 0 | 0 | 0 | 0 | 0 | 0 | 0 | 0 | 0 | 0 | 1 | 1 | 1 | 1 | 2 |
| | 6 4 8 | 6 5 5 | 1 | 0 | 1 | 0 | 0 | 0 | 1 | 0 | 0 | 0 | 0 | 0 | 0 | 1 | 1 | 1 | 1 | 2 |
| | 6 5 6 | 6 6 3 | 1 | 0 | 1 | 0 | 0 | 1 | 0 | 0 | 0 | 0 | 0 | 0 | 1 | 0 | 1 | 1 | 1 | 2 |
| | 6 6 4 | 6 7 1 | 1 | 0 | 1 | 0 | 0 | 1 | 1 | 0 | 0 | 0 | 0 | 0 | 1 | 1 | 1 | 1 | 1 | 2 |
| 56.25° to 67.41° | 6 7 2 | 6 7 9 | 1 | 0 | 1 | 0 | 1 | 0 | 0 | 0 | 0 | 0 | 0 | 1 | 0 | 0 | 1 | 1 | 1 | 2 |
| | 6 8 0 | 6 8 7 | 1 | 0 | 1 | 0 | 1 | 0 | 1 | 0 | 0 | 0 | 0 | 1 | 0 | 1 | 1 | 1 | 1 | 2 |
| | 6 8 8 | 6 9 5 | 1 | 0 | 1 | 0 | 1 | 1 | 0 | 0 | 0 | 0 | 0 | 1 | 1 | 0 | 1 | 1 | 1 | 2 |
| | 6 9 6 | 7 0 3 | 1 | 0 | 1 | 0 | 1 | 1 | 1 | 0 | 0 | 0 | 0 | 1 | 1 | 1 | 1 | 1 | 1 | 2 |
| | 7 0 4 | 7 6 7 | 1 | 0 | 1 | 1 | 0 | 0 | 0 | 0 | 0 | 0 | 1 | 0 | 0 | 0 | 1 | 1 | 1 | 2 |
| 67.5° to 78.66° | 7 6 8 | 8 3 1 | 1 | 1 | 0 | 0 | 0 | 0 | 0 | 0 | 0 | 0 | 0 | 1 | 1 | 1 | 1 | 1 | 1 | 2 |
| 78.75° to 89.90° | 8 3 2 | 8 9 5 | 1 | 1 | 0 | 1 | 0 | 0 | 0 | 0 | 0 | 0 | 1 | 1 | 1 | 1 | 1 | 1 | 1 | 2 |
| | 8 9 6 | 1 0 2 3 | 1 | 1 | 1 | 0 | 0 | 0 | 0 | 0 | 0 | 0 | 1 | 1 | 1 | 1 | 1 | 1 | 1 | 5 |

| Sector | Addend | | | | | | | | Output | | | | | | | | | | | | | | | | | | | |
|---|---|---|---|---|---|---|---|---|---|---|---|---|---|---|---|---|---|---|---|---|---|---|---|---|---|---|---|---|
| | $Y_8$ | $Y_7$ | $Y_6$ | $Y_5$ | $Y_4$ | $Y_3$ | $Y_2$ | $Y_1$ | From | | | | | | | | | | To | | | | | | | | | |
| | | | | | | | | | $L_{10}$ | $L_9$ | $L_8$ | $L_7$ | $L_6$ | $L_5$ | $L_4$ | $L_3$ | $L_2$ | $L_1$ | $L_{10}$ | $L_9$ | $L_8$ | $L_7$ | $L_6$ | $L_5$ | $L_4$ | $L_3$ | $L_2$ | $L_1$ |
| 0° to 44.91° | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| 45.0° to 56.16° | 0 | 0 | 0 | 0 | 0 | 0 | 0 | 1 | 1 | 0 | 0 | 0 | 0 | 0 | 0 | 0 | 0 | 1 | 1 | 0 | 0 | 0 | 0 | 1 | 0 | 0 | 0 | 0 |
| | 0 | 0 | 0 | 0 | 0 | 0 | 0 | 1 | 1 | 0 | 0 | 0 | 0 | 1 | 0 | 0 | 0 | 1 | 1 | 0 | 0 | 0 | 1 | 0 | 0 | 0 | 0 | 0 |
| | 0 | 0 | 0 | 0 | 0 | 0 | 0 | 1 | 1 | 0 | 0 | 0 | 1 | 0 | 0 | 0 | 0 | 1 | 1 | 0 | 0 | 0 | 1 | 1 | 0 | 0 | 0 | 0 |
| | 0 | 0 | 0 | 0 | 0 | 0 | 0 | 0 | 1 | 0 | 0 | 0 | 1 | 1 | 0 | 0 | 0 | 1 | 1 | 0 | 0 | 0 | 1 | 1 | 1 | 1 | 1 | 1 |
| | 1 | 1 | 0 | 0 | 0 | 0 | 0 | 1 | 1 | 0 | 0 | 1 | 0 | 0 | 0 | 0 | 0 | 1 | 1 | 0 | 0 | 1 | 0 | 0 | 0 | 0 | 0 | 1 |
| | 1 | 1 | 0 | 0 | 0 | 0 | 1 | 0 | 1 | 0 | 0 | 1 | 0 | 0 | 0 | 1 | 1 | 1 | 1 | 0 | 0 | 1 | 0 | 0 | 0 | 1 | 0 | 0 |
| 56.25° to 67.41° | 1 | 1 | 0 | 0 | 0 | 1 | 1 | 1 | 1 | 0 | 0 | 1 | 0 | 0 | 1 | 1 | 0 | 1 | 1 | 0 | 0 | 1 | 0 | 0 | 1 | 1 | 1 | 1 |
| | 1 | 1 | 0 | 0 | 1 | 0 | 0 | 0 | 1 | 0 | 0 | 1 | 0 | 1 | 0 | 0 | 1 | 1 | 1 | 0 | 0 | 1 | 0 | 0 | 1 | 1 | 1 | 0 |
| | 1 | 1 | 0 | 0 | 1 | 0 | 0 | 1 | 1 | 0 | 0 | 1 | 0 | 1 | 1 | 0 | 0 | 1 | 1 | 0 | 0 | 1 | 0 | 0 | 1 | 1 | 0 | 1 |
| | 1 | 1 | 0 | 0 | 1 | 1 | 0 | 0 | 1 | 0 | 0 | 1 | 0 | 1 | 1 | 1 | 1 | 1 | 1 | 0 | 0 | 1 | 0 | 1 | 0 | 0 | 0 | 0 |
| | 1 | 1 | 0 | 0 | 1 | 1 | 1 | 1 | 1 | 0 | 0 | 1 | 0 | 1 | 0 | 1 | 0 | 1 | 1 | 0 | 0 | 1 | 0 | 1 | 0 | 1 | 1 | 0 |
| | 1 | 1 | 0 | 0 | 1 | 1 | 1 | 1 | 1 | 0 | 0 | 1 | 0 | 1 | 0 | 1 | 1 | 1 | 1 | 0 | 0 | 1 | 0 | 1 | 0 | 1 | 1 | 0 |
| 67.5° to 78.66° | 0 | 1 | 1 | 0 | 1 | 0 | 0 | 0 | 1 | 0 | 0 | 1 | 0 | 1 | 0 | 0 | 1 | 1 | 1 | 0 | 0 | 1 | 1 | 0 | 0 | 1 | 1 | 1 |
| | 0 | 1 | 1 | 0 | 0 | 1 | 0 | 1 | 1 | 0 | 0 | 1 | 1 | 0 | 0 | 1 | 0 | 1 | 1 | 0 | 1 | 1 | 1 | 0 | 0 | 0 | 0 |
| 78.75° to 89.90° | 0 | 0 | 0 | 0 | 0 | 0 | 0 | 0 | 1 | 0 | 1 | 0 | 0 | 0 | 0 | 0 | 0 | 1 | 0 | 1 | 0 | 0 | 0 | 0 | 0 | 1 | 1 |

It will be appreciated, of course, that the logic diagram of the cosine code converter 102 in accordance with this embodiment of the invention is identical to the sine code generator 104, except, of course, that the input bits are $C_1$ to $C_{10}$ and the output bits are $L'_1$ to $L'_{10}$. The sense inversion logic and the polarity inversion in the reference generator provide the proper polarity and sense for the cosine output word $L'_1$ to $L'_{10}$.

Once the output words $L_1$ to $L_{10}$ and $L'_1$ to $L'_{10}$ are generated, they are applied to the digital-to-analog converters 22 and 24. Only the sine digital-to-analog converter is illustrated, inasmuch as the cosine converter 24 is identical in structure. As shown in FIG. 11, the digital-to-analog converter includes a ladder network 150 including ten series resistors $R_1$ to $R_{10}$ and accompanying shunt resistors. The series resistors have half the resistance of the shunt resistors. Thus, the shunt resistors are designated by 2R. The reference voltage VR1 which is applied from the reference voltage generator via the low output impedance amplifier 90 is applied to various of the shunt resistors through transistor switching circuits 152, 154, NPN transistors. With transistor 176 "on," the reference voltage VR1 is applied to the ladder network. If the $L_1$ bit is binary "0," represented by a negative level, the transistor 178 will be "on" while the transistor 176 is "off." Thus, the shunt resistor will be connected to ground. In this manner, the output word $L_1$ to $L_{10}$ modulates the reference voltage and provides an output voltage which may be represented as the function KVR1 sine $\theta$. It will be recalled, that this is not a true function of sine $\theta$, but rather a function represented by a balanced error or deviation with respect to a true sine $\theta$ function about 45°. Using VR2, a similar cosine function KVR2 cosine $\theta$ is generated. The ratio of these two analog voltages is utilized to operate the indicator mechanism 30, as explained in connection with FIG. 3.

From the foregoing description, it will be apparent that there has been provided an improved digital-to-analog conversion system for shaft positioning, bearing indication and other angular representation purposes. All functions are accomplished by digital means, except for final analog voltage generated in the digital-to-analog converter. Because of this feature, errors due to aging, temperature effects and circuit element tolerances are substantially reduced. Moreover, the use of very rapidly operating digital logic which makes it possible for the system to track changes in angle which are very rapid, for example, greater than 10,000° per second. The limitations, of course, on this tracking rate capability may be the electromechanical display which the system is adapted to drive. Although detailed showing and descriptions of preferred embodiments of the invention have been presented for exemplary purposes, it will be appreciated that variations and modifications in the illustrated systems within the scope of the invention will become apparent to those skilled in the art. Accordingly, the foregoing descriptions should be taken merely as illustrative and not in any limiting sense.

What is claimed is:

1. A system for converting an input digital word representing angle information into corresponding analog information, said system comprising
   (a) means responsive to the bits of said input digital word representing the quadrant of the angle represented by said angle information for providing first and second reference signals respectively having polarities corresponding respectively to the polarity of the sine and cosine of said angle,
   (b) code conversion means for translating the bits of said input digital word representing less than 90° of said angle information into a pair of output digital words respectively, approximating the sine and cosine of said angle, said code conversion means including means for providing said sine and cosine words with the characteristic that the percent error of the values represented by said words with respect to the values representing the actual sine and cosine of said angle is balanced with respect to 45°,
   (c) digital-to-analog conversion means responsive to said sine and cosine output digital words for varying the amplitude of said first and second reference signals respectively to provide a pair of output analog signals, and
   (d) means responsive to the ratio of said analog signals for providing said analog angle information.

2. The invention as set forth in claim 1 wherein said code conversion means includes sense inversion means responsive to said bits of said input digital word representing less than 90° of said angle information and the bit representing the quadrant of said angle information for providing a first pair of intermediate digital words, the value which respectively vary in sense corresponding to the variation of the value of the sine and the cosine of the angle information represented by said input digital word, and means responsive to said different ones of said pair of intermediate words for providing said output words which vary in accordance with the sine and cosine functions and have said balanced error characteristic.

3. The invention as set forth in claim 2 wherein said sense inversion means includes an exclusive OR gate for each of said bits which represent angle information less than 90° and said bit which represents an angle of 90° for providing said intermediate words.

4. The invention as set forth in claim 2 wherein said means for generating said output words includes means responsive to a plurality of the higher order bits representing said angle information of less than 90° for shifting the order of all of said bits representing angle information of less than 90° to provide said sine and cosine output words.

5. The invention as set forth in claim 4 wherein said order shifting means includes gate circuits, each responsive to different combinations of said higher order bits for shifting the order of said word representing angle of less than 90° by certain incremental shifts in order.

6. The invention as set forth in claim 5 including means responsive to said higher order bits for generating different words depending upon the angle represented by said higher order bits, and means for adding said last named words to words generated by said bit order shift logic for providing said output words.

7. The invention as set forth in claim 1 wherein said reference signal providing means includes phase inversion means, and means responsive to the value of said bits of said digital word representing more than 90° and 180° of angle information respectively, for selectively operating said phase inverter means to produce said reference signals.

8. The invention as set forth in claim 1 wherein said digital-to-analog conversion means each includes a ladder network and a plurality of switching means each corresponding to a different bit of said output words for selectively applying a different one of said reference signals to different legs of said ladder network.

9. The invention as set forth in claim 8 wherein said switching means each includes a pair of transistors of opposite conductivity type connected in series between phase inverter means which provide said reference signals and a point of reference potential, the junction of said transistors being connected to the ladder network leg corresponding to its switching means, and another transistor having voltages applied thereacross greater than the peak amplitude of said reference signal coupled to the bases of said first named pair of transistors, and means responsive to one of the bits of said output word for causing said third transistor to alternatively conduct and not conduct in accordance with the value of said bit.

10. The invention as set forth in claim 1 wherein said means for providing said ratio of said analog signals comprises a resolver having stator windings and a rotor winding, means for applying different ones of said analog signals to different ones of stator windings of said resolver, and means responsive to the voltage across said rotor winding for providing a signal representing said analog angle information.

11. The invention as set forth in claim 10 wherein said rotor winding is mounted in a servo mechanism including a motor for rotating an indicator and said rotor to a position representing said angle information.

12. The invention as set forth in claim 11 wherein high gain amplifiers having negative feedback are coupled between the output of different ones of said digital-to-analog conversion means and said resolver stator windings.

References Cited
UNITED STATES PATENTS

| | | | |
|---|---|---|---|
| 2,995,302 | 8/1961 | Ingwerson et al. | 235—152 |
| 3,090,908 | 5/1963 | Mynall | 235—186X |
| 3,134,098 | 5/1964 | Herzel | 340—347 |
| 3,241,133 | 3/1966 | Herzel | 340—347 |
| 3,267,265 | 8/1966 | Popodi et al. | 235—154 |
| 3,277,464 | 10/1966 | Naydan et al. | 340—347 |
| 3,325,805 | 6/1967 | Dorey | 340—347 |

DARYL W. COOK, Primary Examiner

M. K. WOLENSKY, Assistant Examiner

U.S. Cl. X.R.

235—150.53